United States Patent
Eakle et al.

(10) Patent No.: US 10,161,283 B2
(45) Date of Patent: Dec. 25, 2018

(54) UREA DEPOSIT DETECTION FOR USE WITH SCR EMISSIONS CONTROL SYSTEM

(71) Applicant: Southwest Research Institute, San Antonio, TX (US)

(72) Inventors: Scott Eakle, San Antontio, TX (US); Cary Henry, Helotes, TX (US); Phillip Weber, Fair Oaks Ranch, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 15/596,000

(22) Filed: May 16, 2017

(65) Prior Publication Data
US 2018/0334943 A1    Nov. 22, 2018

(51) Int. Cl.
| | |
|---|---|
| *F01N 11/00* | (2006.01) |
| *F01N 9/00* | (2006.01) |
| *F01N 3/20* | (2006.01) |
| *F01N 3/28* | (2006.01) |

(52) U.S. Cl.
CPC ........... *F01N 9/007* (2013.01); *F01N 3/2066* (2013.01); *F01N 3/2892* (2013.01); *F01N 9/002* (2013.01); *F01N 11/002* (2013.01); *F01N 2550/05* (2013.01); *F01N 2560/12* (2013.01); *F01N 2610/02* (2013.01); *F01N 2610/1453* (2013.01)

(58) Field of Classification Search
CPC .................................................. F01N 2560/12
See application file for complete search history.

(56) References Cited

U.S. PATENT DOCUMENTS

| | | | |
|---|---|---|---|
| 2017/0096924 A1* | 4/2017 | Silver | ..................... F01N 3/208 |
| 2017/0211453 A1* | 7/2017 | Sappok | .................. H04B 17/18 |

\* cited by examiner

*Primary Examiner* — Jonathan Matthias
(74) *Attorney, Agent, or Firm* — Livingston Law Firm

(57) ABSTRACT

A method of detecting urea-derived deposits in the exhaust line of an internal combustion engine having an SCR (selective catalyst reduction) aftertreatment system. A radio frequency (RF) transmitter is placed upstream of the SCR system's urea injector, and an RF receiver is placed downstream of the mixer. The transmitter and receiver are used to acquire baseline RF data representing a clean condition exhaust line without deposits. During subsequent operation of the engine, the transmitter and receiver are used to acquire subsequent RF data, which is compared to the baseline data after being corrected for temperature differences. If the comparison indicates the presence of one or more deposits, an alert signal is generated.

7 Claims, 1 Drawing Sheet

UREA DEPOSIT DETECTION FOR USE WITH SCR EMISSIONS CONTROL SYSTEM

TECHNICAL FIELD OF THE INVENTION

This invention relates to internal combustion engines, and more particularly to detecting urea deposits in a selective catalytic reduction (SCR) system used for reducing undesired emissions from such engines.

BACKGROUND OF THE INVENTION

Polluting emissions from internal combustion engines are increasingly subject to regulation. These regulations have led to the use of a wide variety of emissions control technologies.

One approach to reducing regulated emissions is selective catalytic reduction (SCR). SCR is typically used to reduce oxides of nitrogen (NOx) emissions in lean burn engine exhaust, such as diesel exhaust. SCR methods mix a reductant with the engine exhaust, and flow this mixture through a special catalyst. The reductant sets off a chemical reaction within the catalyst that converts NOx in the exhaust into nitrogen, a natural component of air.

For SCR applications that are not necessarily automotive, several reductants are currently used. These reductants include anhydrous ammonia, aqueous ammonia or urea. Pure anhydrous ammonia is toxic and difficult to safely store, but needs no further conversion to operate within an SCR catalyst. It is typically favored by large industrial SCR applications. Aqueous ammonia must be dehydrated in order to be used, but it is safer to store and transport than anhydrous ammonia. Urea is the safest to store, but requires conversion to ammonia through thermal decomposition and hydrolysis before use as a reductant.

For automotive SCR applications, a solution of automotive-grade urea is typically used as the reductant source. For this application, the urea solution is sometimes referred to as diesel exhaust fluid (DEF) or AdBlue in Europe.

In SCR emissions aftertreatment systems, the urea water solution decomposition process is complex, and presents issues with solid deposit formation. These deposits can affect the efficiency of urea decomposition, and if large enough, can inhibit exhaust flow. Deposit formation is a significant challenge to SCR aftertreatment system designers due to the complexity of contributing factors such as temperature, flow rate, flow distribution, dosing rate, wall or mixer surfaces, and droplet size distribution.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following invention is directed to the use of radio frequency (RF) sensors to detect solid deposits formed within an SCR (selective catalytic reduction) emissions control system. As indicated in the background, SCR aftertreatment is "selective" because it reduces levels of NOx selectively to nitrogen using a reductant within a catalyst. The chemical reaction is known as "reduction" because the reducing agent (reductant), in this case ammonia (NH3), reacts with NOx to convert the pollutants into nitrogen and water. For automotive emissions control applications, the reductant is typically a urea solution.

Figure 1:
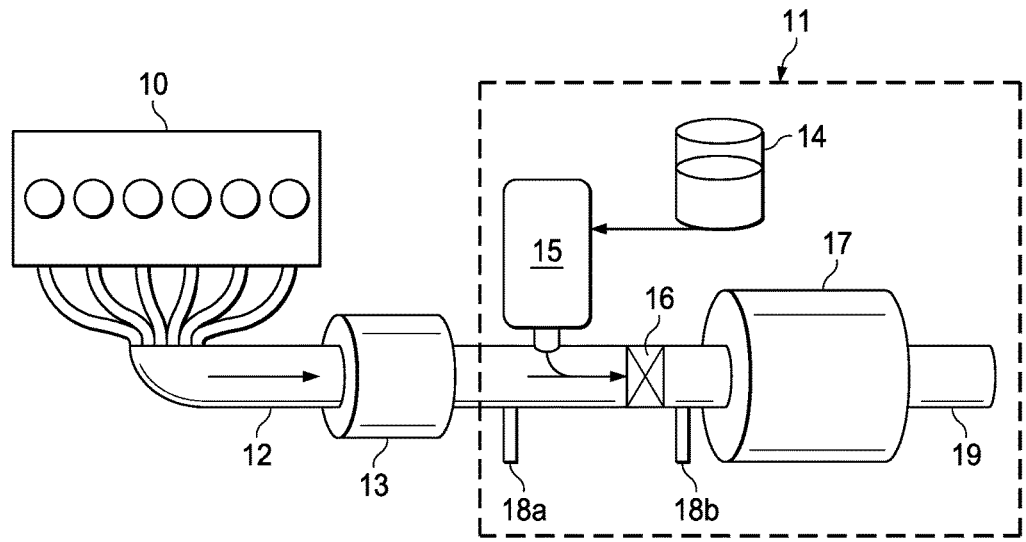
FIG. 1 illustrates an engine having an SCR aftertreatment system in accordance with the invention.

FIG. 1 illustrates an engine 10 having a SCR emissions control system 11. Engine 10 may be any internal combustion engine that produces NOx-containing exhaust. The exhaust is exhausted from the engine 10 into a main exhaust line 12, where it is treated by the SCR system 11.

Although not essential to the invention, the engine's exhaust aftertreatment system may contain one or more additional aftertreatment devices 13 in addition to the SCR system 11, upstream or downstream the SCR system 11. Examples of such additional aftertreatment devices 13 are a diesel particulate filter or an oxidation catalyst.

The SCR system 11 has four main elements: urea tank 14, injector 15, mixer 16, and SCR catalyst 17. The injector 15, mixer 16, and SCR catalyst 17 are located along exhaust line 12, in that order, as shown.

As explained below in connection with FIG. 2, an RF (radio frequency) transmitter 18a is installed upstream injector 15, and an RF receiver 18b is installed between mixer 16 and SCR catalyst 17. Transmitter 18a and receiver 18b are installed so that they transmit and receive RF signals within an inner area of the exhaust line 12, in a deposit-prone region.

Urea tank 14 is an on-board tank to store a urea solution. An example of a typical urea solution is a non-toxic fluid composed of purified water and automotive grade aqueous urea, such as a 32.5% urea solution. Urea tank 14 may be placed in various locations, convenient for refilling and for avoiding freezing of the stored urea solution.

During vehicle operation, tank 14 delivers stored urea solution to injector 15. Tank 14 is periodically replenished by the vehicle operator.

Injector 15 is located such that it may inject its output (the urea solution) into the exhaust stream upstream the input to SCR catalyst 17. After injection, and within the exhaust line 12, the urea solution decomposes to produce the ammonia for reduction of NOx by SCR catalyst 17.

Mixer 16 is installed between injector 15 and SCR catalyst 17. Mixer 16 is used to enhance ammonia distribution. An example of a suitable mixer is a static mixer, of a type used in various flow line applications.

The evaporation and decomposition of the urea aqueous solution that is injected into the exhaust gas flow plays a crucial role for the performance of SCR catalyst 17. By using mixer 16, ammonia produced as a result of this decomposition is homogeneously distributed over the surface of SCR catalyst 17 to match with NOx distribution.

The mixture of reductant and engine exhaust is adsorbed onto the catalyst bed of SCR catalyst 17. SCR catalyst 17 may be any SCR type of exhaust aftertreatment device, such as are in commercial use today or to be developed. Examples of suitable SCR catalysts are those manufactured from various materials used as a carrier, such as titanium oxide or zeolites. Active catalytic components are usually oxides of base metals, such as vanadium, iron and copper.

Common geometries for SCR catalysts are honeycomb, plate and corrugated. The honeycomb type may be manufactured with an extruded catalyst or with a catalyst applied onto a ceramic carrier or substrate. Plate-type catalysts have lower pressure drops and may be less susceptible to plugging and fouling than honeycomb types, but plate configurations are larger and more expensive and often less efficient.

SCR catalyst 17 may be located under the vehicle floorboard, in the usual location for exhaust aftertreatment devices in automobiles, trucks, etc. The treated exhaust from SCR catalyst 17 flows into the atmosphere via the engine tailpipe 19.

Figure 2:
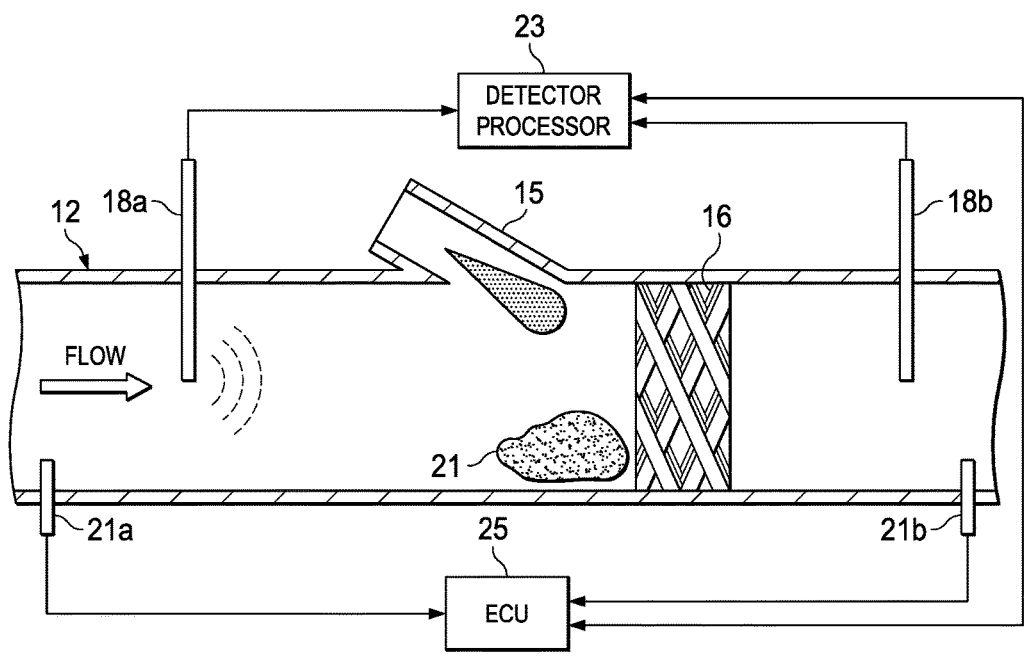
FIG. 2 illustrates the urea-derived deposit detection system and method.

FIG. 2 illustrates the urea-derived deposit detection system and method in further detail. As illustrated, a urea-derived deposit 21 has formed at the face of mixer 16. Ideally, complete decomposition of the urea produces only ammonia and carbon dioxide. However, in reality, urea decomposition reaction is a two-step process that includes the formation of ammonia and isocyanic acid as intermediate products via thermolysis. Being highly reactive, isocyanic acid can initiate the formation of larger molecular weight compounds. These compounds can be responsible for the formation of solid deposits in the SCR system.

Deposits may form on inner walls of exhaust pipe 12, as well as at or in mixer 16. The RF transmitter 18a and receiver 18b are located so that they will detect deposits in a region of the exhaust line 12 anywhere between them, that is, between injector 15 and mixer 16. The deposits maybe anywhere, but are typically on the exhaust line's lower inner walls or at the face of mixer 16. A typical location of deposits is as illustrated, due to the angle of injection toward the wall opposite injector 15.

In addition to RF transmitter 18a and receiver 18b, the deposit detection system comprises two temperature sensors 21a and 21b. A first temperature sensor 21a is located near the RF transmitter 18a. A second temperature sensor 21b is located near RF receiver 18b.

Temperature sensors 21a and 21b may be the same as existing temperature sensors within the exhaust aftertreatment system. For example, temperature sensor 21a could be implemented with an existing temperature sensor at the outlet of an aftertreatment device 13. Temperature sensor 21a could be implemented with an existing temperature sensor at the inlet to SCR catalyst 17. Existing temperature sensors deliver data to an engine control unit 25 for various exhaust system control strategies. If existing temperature sensors are used, their data can be transferred from engine control unit (ECU) 25 to detector processor 23.

Detector processor 23 is programmed to receive input from RF transmitter 18a and RF receiver 18b, as well as from temperature sensors 21a and 21b (directly or via ECU 25). It is further programmed to process this data, and to generate an output signal, as explained below. Detector processor 23 may be implemented with various controller or processing devices, with memory and programming to implement the method described herein. Although detector processor 23 is shown as a discrete unit, it could easily be integrated with other control elements of the engine system, such as with an engine control unit (ECU).

In operation, an RF signal is transmitted and received within the region of interest in exhaust line 12, using transmitter 18a and receiver 18b. Baseline response data is acquired for a clean (without deposits) exhaust line between the transmitter 18a and receiver 18b. If desired, baseline data can be acquired for various operating conditions of the engine 10. The baseline data are stored in detector processor 23.

During subsequent engine operation and over time, transmitter 18a and receiver 18b continue to provide response data associated with the same region of interest as the baseline data. This subsequent data acquisition can be at a predetermined desired interval schedule, or at any desired time. If a deposit has formed, the RF response signal will differ from the baseline signal. The density of the area within the region of interest will become greater if deposits are present, which affects the RF response signal received at receiver 18b.

Various modeling techniques can be used to model profiles of exhaust lines and deposits. These models can be used to develop various RF testing and comparison methods, such as by using resonant modes and frequencies. Known techniques can be used for analyzing the effect on signal characteristics by materials through which RF waves travel and/or are reflected within a flow line.

The presence of one or more deposits will affect the density within the region between the RF transmitter 18a and receiver 18b. In a more dense region, the speed of the RF waves will be slower. Interpretation of the response signal is used to identify the presence of deposits.

Detector processor 23 compares stored baseline data to subsequently acquired response data. It also receives temperature output from temperature sensors 21a and 21b. Gas density is highly transient in an engine exhaust environment; the colder the gas, the more dense is the gas and RF waves will move more slowly. To prevent false readings of the RF response, detector processor 23 is programmed to correct, with temperature data, the RF response signal in the region of interest.

The two temperature readings can be used to obtain an "average" temperature in the region between the two temperature sensors 21a and 21b. This average can be used to correct the density data indicated by the RF response signal, such that the RF response data can be correlated to the baseline RF data. In other words, a change in density due to deposits can be isolated from a change in density due to temperature differences. More sophisticated correction techniques can be used, such as by using temperature models to derive a temperature correction factor or function.

If the RF response comparison indicates that a threshold difference level is exceeded, detector processor 23 can provide an indication that at least one deposit has formed. This indication can be in the form of an alert output signal to an engine operator, or can be used internally by detector processor 23 to take further action. For example, the results of the comparison can be used by detector processor 23 to further generate a "regeneration required" signal to the engine control unit (ECU) 25. The ECU 25 can then initiate a regeneration process that includes the region in which a deposit has been detected.

Regeneration is a high temperature event controlled by the engine control unit of today's vehicles, and is typically called "active" regeneration in diesel aftertreatment systems. Regeneration decomposes and removes solid deposit formations. Conventionally, regeneration control strategies rely on time-based active regeneration, which occurs at predetermined intervals regardless of whether deposits actually exist.

It should be noted that active regenerations reduce fuel economy due to the requirement of an external energy source (typically unburned fuel). Thus, efficiency of the engine decreases during active regenerations. The RF sensing method described herein can be used to monitor the state of the exhaust line, and to trigger an active regeneration on an as needed basis. This can reduce the frequency and/or duration of active regeneration.

It can further be noted that the positions of transmitter 18a and receiver 18b could be switched. Or, both devices could be implemented as transmitter/receivers. These variations are considered equivalents for purposes of this description.

What is claimed is:

1. A method of detecting urea-derived deposits in the exhaust line of an internal combustion engine, comprising:
   providing the engine with an SCR (selective catalyst reduction) aftertreatment system with an injector, mixer, and SCR catalyst;
   identifying a region of interest within the exhaust line between the injector and the mixer likely to collect deposits;
   placing a radio frequency (RF) transmitter upstream of the region of interest;
   placing an RF receiver in the exhaust line downstream of the region of interest;
   placing a first temperature sensor at a location to measure the temperature of exhaust upstream of the region of interest;
   placing a second temperature sensor at a location to measure the temperature of exhaust downstream of the region of interest;
   during operation of the engine, using the RF transmitter and the RF receiver to acquire baseline data representing a clean condition of the region of interest without deposits;
   storing the baseline data in a processor;
   during subsequent operation of the engine, using the transmitter and receiver to acquire RF response data representing overall density in the region of interest;
   using temperature data from the first temperature sensor and from the second temperature sensor to calculate a density correction factor due to gas density within the region of interest;
   using the temperature correction factor to isolate changes in density within the region of interest due to deposits from changes in density within the region of interest due to gas temperature, thereby determining corrected RF response data;
   using the processor to compare the baseline data to the corrected RF response data; and
   if the comparison indicates the presence of one or more deposits, using the processor to generate an alert signal.

2. The method of claim 1, wherein the alert signal represents a command to initiate a regeneration process.

3. The method of claim 1, wherein the alert signal is delivered to an engine control unit.

4. The method of claim 1, wherein the RF response data represent the velocity of an RF signal through the region of interest.

5. The method of claim 1, wherein the correction factor represents an average temperature in the region of interest.

6. The method of claim 1, wherein the correction factor is derived from temperature models and from data from the first and second temperature sensor.

7. A system for detecting urea-derived deposits in a region of interest in the exhaust line of an internal combustion engine having an SCR (selective catalyst reduction) aftertreatment system with an injector, mixer, and SCR catalyst, comprising:
   a radio frequency (RF) transmitter upstream of both the injector and the mixer;
   an RF receiver in the exhaust line downstream of the mixer;
   a first temperature sensor operable to measure the temperature of exhaust gas upstream of the region of interest;
   a second temperature sensor operable to measure the temperature of exhaust gas downstream of the region of interest;
   a processor operable to perform the following tasks: to store baseline data derived from the RF receiver and representing a clean condition of the region without deposits, at a known temperature of the region; during operation of the engine, to instruct the RF transmitter and RF receiver to acquire RF response data representing the overall density within the region of interest; to acquire temperature data from the first and the second temperature sensors, to determine a density correction factor representing the effect of gas density on the overall density; to correct the RF response data with the density correction factor; to compare the baseline data to the subsequent data; and if the comparison indicates the presence of one or more deposits, to generate an alert signal.

* * * * *